US006233341B1

United States Patent
Riggins

(10) Patent No.: US 6,233,341 B1
(45) Date of Patent: May 15, 2001

(54) SYSTEM AND METHOD FOR INSTALLING AND USING A TEMPORARY CERTIFICATE AT A REMOTE SITE

(75) Inventor: Mark D. Riggins, San Jose, CA (US)

(73) Assignee: Visto Corporation, Mountain View, CA (US)

( * ) Notice: Subject to any disclaimer, the term of this patent is extended or adjusted under 35 U.S.C. 154(b) by 0 days.

(21) Appl. No.: 09/081,268

(22) Filed: May 19, 1998

(51) Int. Cl.[7] ........................................ H04K 1/00

(52) U.S. Cl. .................... 380/277; 277/278; 713/175; 713/156; 713/158

(58) Field of Search ................... 380/277, 278; 713/156, 158, 175

(56) References Cited

U.S. PATENT DOCUMENTS

| 4,652,698 | 3/1987 | Hale et al. ............................ 380/24 |
| 4,831,582 | 5/1989 | Miller et al. ........................ 707/104 |
| 4,897,781 | 1/1990 | Chang et al. ........................ 364/200 |

(List continued on next page.)

FOREIGN PATENT DOCUMENTS

| 2191505 | 6/1997 | (CA) ............................ H04M/3/42 |
| 2210763 | 1/1999 | (CA) . |
| 0801478 | 10/1997 | (EP) . |

OTHER PUBLICATIONS

Article by Bellovin et al., entitled: "Network Firewalls" Published by IEEE Communications Magazine Sep. 1994, pp. 50–57.

Article by Steffen Stempel, entitled: "IPAccess—An Internet Service Access System for Firewall Installations" Published by IEEE Communications Magazine Feb. 16, 1995, pp. 31–41.

Article by Braun et al., entitled: "Web Traffic Characterization: an assessment of the impact of caching documents from NCSA's web server" Published by Elsevier Science B.V. 1995 pp. 37–51.

(List continued on next page.)

Primary Examiner—Thomas R. Peeso
Assistant Examiner—Todd Jack
(74) Attorney, Agent, or Firm—Squire, Sanders & Dempsey L.L.P.

(57) ABSTRACT

A system installs and enables the use of a temporary certificate at a remote site. The system comprises a global server site, a temporary client site and a web site. The global server site includes a security module that identifies and authenticates the user at the temporary client site, and a web server engine that downloads a key generation downloadable and a certificate request engine downloadable upon user authentication to the client site. The client site includes a web engine that executes the key generation downloadable to generate a public key and a private key, and executes the certificate request engine downloadable to send the a temporary certificate request (including the public key) to the global server site. A temporary certificate generator at the global server site generates a temporary certificate having the public key and a validity period. The web server on the global server site sends the temporary certificate and a certificate installation downloadable to the web engine on the client site, which executes the downloadable thereby installing the temporary certificate. The web server on the global server site can also send a certificate maintenance downloadable and a certificate de-installation downloadable to the client site. The web server engine maintains a revocation list that contains information identifying revoked temporary certificates, so that a revoked but thusfar unexpired certificate cannot be improperly used. The web site reviews the temporary certificate for authenticity and contacts the global server site to review the revocation list and determine whether the temporary certificate has been revoked.

44 Claims, 12 Drawing Sheets

U.S. PATENT DOCUMENTS

| | | | |
|---|---|---|---|
| 5,048,085 | | 9/1991 | Abraham et al. ........................ 380/23 |
| 5,220,603 | * | 6/1993 | Parker ..................................... 380/21 |
| 5,263,157 | | 11/1993 | Janis ......................................... 707/9 |
| 5,373,559 | | 12/1994 | Kaufman et al. ....................... 380/30 |
| 5,420,927 | * | 5/1995 | Micali ..................................... 380/23 |
| 5,434,918 | | 7/1995 | Kung et al. ............................. 380/25 |
| 5,491,752 | | 2/1996 | Kaufman et al. ....................... 380/30 |
| 5,495,533 | | 2/1996 | Linehan ................................. 380/21 |
| 5,544,322 | | 8/1996 | Cheng et al. .................... 395/200.12 |
| 5,572,643 | | 11/1996 | Judson ................................. 395/793 |
| 5,581,749 | | 12/1996 | Hossain et al. .......................... 707/1 |
| 5,613,012 | | 3/1997 | Hoffman et al. ..................... 382/115 |
| 5,623,601 | | 4/1997 | Vu .................................. 395/187.01 |
| 5,627,658 | | 5/1997 | Connors et al. ..................... 358/407 |
| 5,644,354 | | 7/1997 | Thompson et al. ..................... 348/13 |
| 5,647,002 | | 7/1997 | Brunson ................................. 380/49 |
| 5,657,390 | | 8/1997 | Elgamal et al. ........................ 380/49 |
| 5,666,530 | | 9/1997 | Clark et al. ........................... 395/617 |
| 5,666,553 | | 9/1997 | Crozier ................................. 395/803 |
| 5,682,478 | | 10/1997 | Watson et al. .................. 395/200.12 |
| 5,682,524 | | 10/1997 | Freund et al. ........................ 395/605 |
| 5,684,990 | | 11/1997 | Boothby .............................. 707/203 |
| 5,701,423 | | 12/1997 | Crozier ................................. 395/335 |
| 5,706,427 | | 1/1998 | Tabuki ............................ 395/187.01 |
| 5,706,502 | | 1/1998 | Foley et al. ............................ 707/10 |
| 5,715,403 | | 2/1998 | Stefik ..................................... 705/44 |
| 5,721,779 | | 2/1998 | Funk ...................................... 380/23 |
| 5,757,916 | | 5/1998 | MacDoran et al. .................... 380/25 |
| 5,778,346 | | 7/1998 | Frid-Nielsen et al. ............... 395/208 |
| 5,784,463 | | 7/1998 | Chen et al. ............................. 380/21 |
| 5,784,464 | | 7/1998 | Akiyama et al. ....................... 380/25 |
| 5,787,172 | * | 7/1998 | Arnold ................................... 380/21 |
| 5,799,086 | * | 8/1998 | Sudia ..................................... 380/23 |
| 5,828,840 | | 10/1998 | Cowan et al. ................... 395/200.33 |
| 5,870,544 | * | 2/1999 | Curtis .............................. 395/187.01 |
| 5,951,652 | * | 9/1999 | Ingrassia, Jr. ........................ 709/248 |
| 5,982,898 | * | 11/1999 | Hsu et al. ............................... 380/23 |
| 5,999,947 | | 12/1999 | Zollinger et al. .................... 707/203 |

OTHER PUBLICATIONS

Article by Nelson et al., entitled: "Security for Infinite Networks" Published by IEEE Communications Magazine on Aug. 22, 1995, pp. 11–19.

Article by Greenwald et al., entitled: "Designing an Academic Firewall: Policy, Practice, and Experience with SURF" Published by IEEE Communications Magazine on Feb. 22, 1996, pp. 79–92.

Article by Kiuchi et al., entitled: "C–HTTP—The Development of a Secure, Closed HTTP–based Network on the Internet" Published by IEEE Proceedings of SNDSS on Feb. 22, 1996, pp. 64–75.

Article by S. Cobb, entitled: "Establishing Firewall Policy" Published by National Computer Security Assn. on Jun. 25–27, 1996, pp. 198–205.

Tanenbaum, Andrew S., "Computer Network", Third Edition, Prentice–Hall 1996, ISBN 0–13–349945–6, Chapter 7, Sections 7.1.4 to 7.1.6, pp. 597–618.

Knudsen, Jonathan, "Java Cryptography", First Edition, O'Reilly & Assoc. 1998, ISBN 1–56592–402–9, pp. 79–91.

Web page: www.verisign.com/press/product/isv.html, Verisign Press Release, "Verisign Enhances Digital IDS to Enable Universal Website Login and One–Step Registration", Nov. 3, 1998, 3 pages.

Freier et al., entitled "The SSL Protocol, Version 3.0," Netscape Communications, dated Nov. 18, 1996, pp. 1–59, Downloaded from URL=http://www.home.netscape.com/eng/ss13/draft302.txt.

Mark R. Brown et al. "Using Netscape 2", Second Edition, QUE Corporation, 1995, Chapter 34 "Sun's Java and the Netscape Browser", pp. 885–907.

* cited by examiner

SYSTEM AND METHOD FOR INSTALLING AND USING A TEMPORARY CERTIFICATE AT A REMOTE SITE

PRIORITY REFERENCE(S) TO PRIOR APPLICATION(S)

This application claims priority of and hereby incorporates by reference U.S. patent application Ser. No. 08/766,307, entitled "System and Method for Globally Accessing Computer Services," filed on Dec. 13, 1996, by inventors Mark D. Riggins, et al; U.S. patent application Ser. No. 08/841,950, entitled "System and Method for Enabling Secure Access to Services in a Computer Network", filed on Apr. 8, 1997, by inventor Mark D. Riggins; U.S. patent application Ser. No. 08/865,075, entitled "System and Method for Using a Global Translator to Synchronize Workspace Elements Across a Network," filed on May 29, 1997, by inventors Daniel J. Mendez, et al.; U.S. patent application Ser. No. 08/835,997, entitled "System and Method for Securely Synchronizing Multiple Copies of a Workspace Element in a Network," filed on Apr. 11, 1997, by inventors Daniel J. Mendez, et al.; U.S. patent application Ser. No. 08/897,888, entitled "System and Method for Synchronizing Electronic Mail Across a Network," filed on Jul. 22, 1997, by inventors Daniel J. Mendez, et al.; U.S. patent application Ser. No. 08/899,277, entitled "System and Method for Using an Authentication Applet to Identify and Authenticate a User in a Computer Network," filed on Jul. 23, 1997, by inventor Mark D. Riggins; and U.S. patent application Ser. No. 8/903,118, entitled "System and Method for Globally and Securely Accessing Unified Information in a Computer Network," filed on Jul. 30, 1997, by inventors Daniel J. Mendez, et al.

BACKGROUND OF THE INVENTION

1. Field of the Invention

This invention relates generally to computer networks, and more particularly provides a system and method for installing a temporary certificate at a remote site.

2. Description of the Background Art

The Internet has become one of the most popular tools used by businesses and individuals for obtaining services and needed information. When a web client, e.g., a user operating a network browser, communicates via the Internet with a web server (i.e., a web site), the web server recognizes the web client based on information received in a certificate that was installed on the web client and that was downloaded to the web server. The conventional certificate identifies the user, provides information needed to establish secure network communications between the client and the server, and includes a signature from a certifying authority such as VeriSign, Inc. of Mountain View, Calif. that provides certificate integrity, authenticity and origin.

More particularly, a user typically requests a certificate from a certifying authority, i.e., a third party mutually trusted by the user and the web server. The user operates pre-installed software for generating a public/private key pair, and sends a certificate request including the public key to the certifying authority. The certifying authority verifies the identity and any other information needed about the user, packages the user's name, the public key, a validity period and an assigned serial number together, and digitally signs the package, thereby creating a signed certificate. The certifying authority then sends the signed certificate to the user, who installs the signed certificate and the private key associated with the packaged public key in one or more web clients.

For completeness, a brief review of public/private key cryptography is provided. Mathematically, a public and private key pair are generated to encrypt and decrypt messages. That is, either key can be used to encrypt a message, but only the other key of the key pair can be used to decrypt the message. The owner keeps the private key private, but allows everyone to know the public key. Accordingly, anyone can encrypt a message using the public key, but only the owner can decrypt the message, because the owner is the only one who knows the private key. Similarly, the owner can encrypt a message using the private key, and thus everyone can use the public key to decrypt the message. A user that uses a public key to decrypt an encrypted message can be sure that the message was encrypted by someone who has the corresponding private key. So long as the private key is kept private, the user can be assured that the owner of the private key sent the message. If both parties to a communication have public/private key pairs, then each party can communicate privately with the other by encrypting messages with the recipient's public key.

However, how can the sender be confident that they are using the correct public key for the recipient? Exchanging keys personally may be too inconvenient. Instead, both parties present their public keys, other identifying information and proof of their identity to a mutually trusted certificate authority. The certificate authority verifies the user's identity and issues a public key certificate containing the user's public key and distinguished name. If both parties wish to communicate privately via web clients, then they may install their private keys and public key certificates in their respective web clients. The certificate authority may also issue certificates to identify web servers, showing that a given server name such as "www.briefcase.com" was issued to Visto Corporation of Mountain View, Calif.

When a web client connects to a web server, the web client and web server identify and authenticate each other and negotiate a secure communications channel. For identification, both parties exchange public key certificates. Accordingly, each party uses the public key of the certificate authority to verify the signature of the other party's certificate. As stated above, the public key certificate binds a public key to a subject name (i.e., distinguished name) such as the client's name or server's name. The parties recognize each other by the subject name included in the certificate. To authenticate this identity, each party proves to the other that they possess the private key associated with the public key included in the certificate. One method of authenticating, employed by Secure Sockets Layer (SSL) technology, includes the steps of choosing a random number and encrypting it using the other party's public key. The encrypted number is sent to the other party who decrypts it and returns the decrypted value, thereby proving that they possess the private key.

After authenticating each other's identity, both parties exchange one or more symmetric keys used to encrypt the bulk of their communications. "The SSL Protocol, Version 3.0" by Netscape Communications Corporation., attached hereto and incorporated herein, describe additional details of a session-oriented protocol, such as how parties agree upon cryptographic algorithm and what key length to use. S/MIME by RSA Data Security and PEM encryption techniques illustrate example systems for sending individual messages encrypted under symmetric keys communicated with public key encryption and public key certificates.

Conventional certificates do not solve all problems and concerns for the roaming user. For example, transporting a private key to and installing the private key at every temporary terminal used by the roaming user is unsafe because the private key may be stolen or hacked from the temporary terminal. Still further, sending an owner's private key over the Internet or reading it from a floppy disk or other storage media also pose substantial security risks. SmartCards such as those made Litronic Inc. can be used to transport private keys safely but are not widely deployed and are subject to physical loss. Further, SmartCard readers are not available at most kiosks.

Therefore, a system and method for facilitating the use of public key certificates by the roaming user are needed.

SUMMARY OF THE INVENTION

The present invention provides a system for installing and enabling the use of a temporary certificate at a remote site. Temporary certificates can safely be installed because they expire quickly and can be revoked when the user leaves the remote site. The system comprises a global server site, a temporary client site and a web site. The global server site includes a security module that identifies and authenticates the user at the client site, and a web server engine that upon user authentication downloads a key generation downloadable and a certificate request engine downloadable to the client site. It will be appreciated that the global server site may include its own certificate authority or may interact with a third party certificate authority to establish client trust and generate temporary certificates.

The temporary client site includes a web engine that executes the key generation downloadable to generate a public and private key pair, and that executes the certificate request engine downloadable to send a temporary certificate request (including the public key) to the global server site. The global server site further includes a temporary certificate generator for generating a signed temporary certificate having the public key, a short term validity period (e.g., expiration date and time), a subject name (e.g., user identity) and other information. The temporary certificate's validity period is set to limit the usefulness of the temporary certificate to a desired lifetime. This can be made arbitrarily short if additional temporary certificates are generated and installed with extensions as needed.

Upon request by the temporary client site, the web server on the global server site sends the temporary certificate and a certificate installation downloadable to the web engine on the client site, which executes the downloadable, thereby installing the temporary certificate. The web server on the global server site can also send a certificate maintenance downloadable and a certificate de-installation downloadable to the client site. The global server site (operating as the certifying authority) may maintain a revocation list that contains information identifying revoked temporary certificates, so that revoked but thus far unexpired certificates cannot be used improperly. Since they are no longer valid, expired temporary certificates may be removed from the revocation list.

Once the temporary certificate has been installed, the client site can communicate with any web site that recognizes the certificate authority, e.g., on the global server site. As an alternative, the global server site may contact a third party certificate authority such as VeriSign, Inc. of Mountain View, Calif. to sign the temporary certificate on behalf of the global server site. As a second alternative, the third party certifying authority can vouch for the global server site, so that the global server site will be recognized as a certificate authority. This is conventionally referred to as "certificate chaining."

As a third alternative, the global server can generate a self-certified limited certificate for the user, for installation on the temporary client. A self-certified limited certificate is a certificate derived from a traditional public key certificate and from its private key. The self-certified limited certificate has the same subject name (e.g., user identity), a different public key and a validity period shorter than the traditional validity period (e.g., between five and thirty minutes). A self-certified limited certificate is signed by the private key associated with the traditional public key certificate. When using this alternative, the user's private key and traditional certificate are stored on the global server. The client generates a temporary public/private key pair and request for a temporary certificate as before. When the client connects to the web site, both the traditional certificate and the temporary certificate are used. The certificate authority's well-known public key is used to verify the signature of the traditional certificate. The public key in the traditional certificate is used to verify the signature of the temporary certificate. Thus, a web site can accept the self-certified limited certificate in lieu of the long-term traditional certificate.

Whether the temporary certificate is issued (i.e., signed) by the global server, the third party certificate authority or the individual certificate holder, the user can install the temporary certificate in the client site and can contact any web site that recognizes the certifying authority of the certificate. The web site reviews the temporary certificate for authenticity and contacts the certificate authority, which in this instance is the global server site, to determine whether the temporary certificate has been revoked.

A claimed system comprises a server for receiving a request for installation of a temporary certificate from a temporary client site, a temporary certificate generator coupled to the server for generating a temporary certificate with an expiration date and time, and a certificate installation downloadable coupled to the server for causing the client site to install the temporary certificate.

A claimed method for installing and enabling use of a temporary certificate at a remote site comprises the steps of receiving from a temporary client site a request for installation of a temporary certificate, generating a temporary certificate with an expiration date and time, and delivering the temporary certificate and a certificate installation downloadable to the client site.

The system and method of the present invention advantageously enable a roaming user to securely install a temporary certificate on a remote site, without transmitting a private key across the computer network. A user need not maintain and port certificates for installation at the remote sites. The system and method may enable any web site that recognizes the certificate authority issuing the temporary certificate to identify and authenticate the user. The system and method enable logging of temporary certificate usage. The system and method monitor for expired temporary certificates. The system and method provide a simple technique enabling a web site to authenticate a temporary certificate and to determine whether a still current temporary certificate has been revoked. Further, the permanent private key has not been compromised.

DETAILED DESCRIPTION OF THE PREFERRED EMBODIMENT

Figure 1:
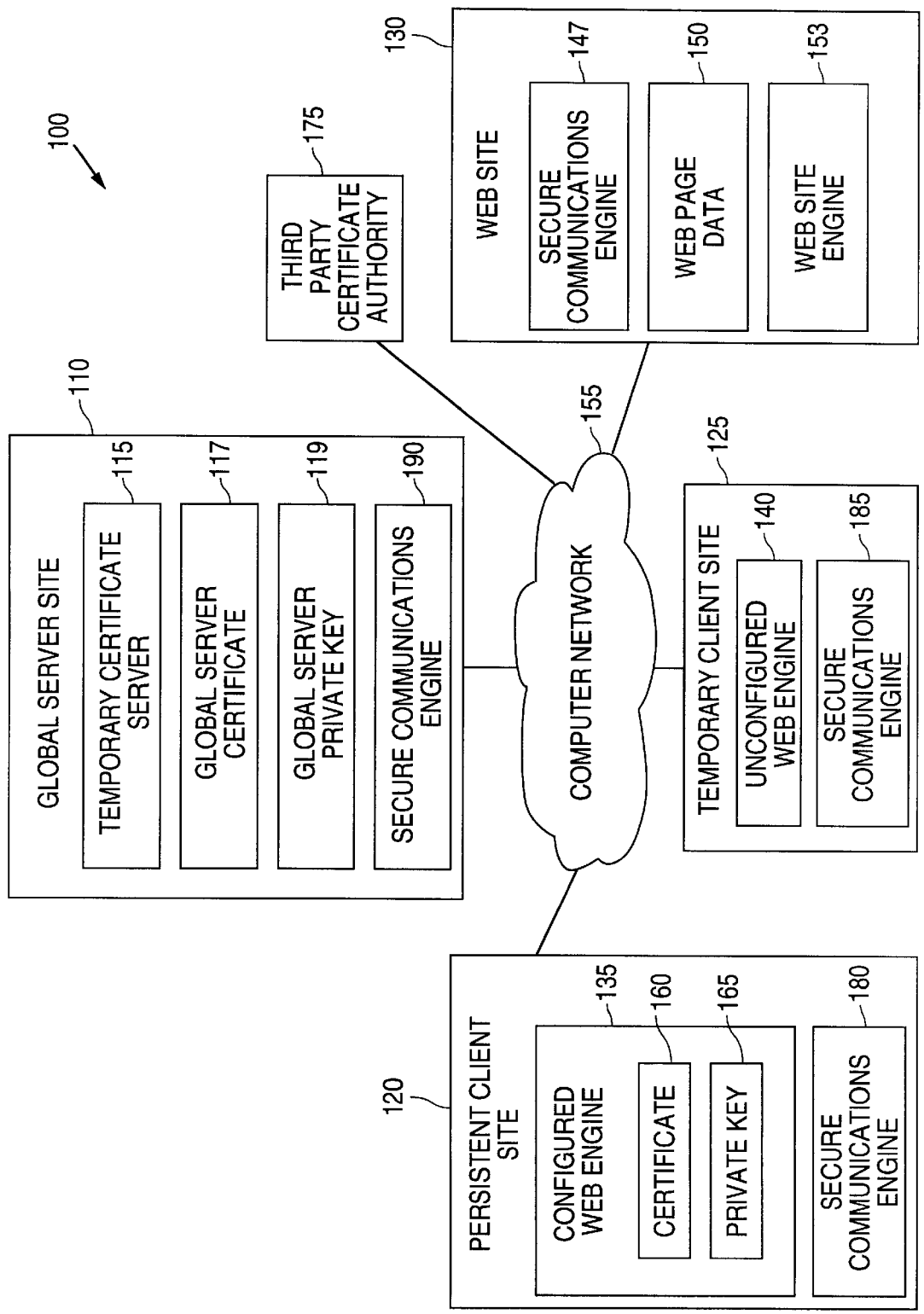
FIG. 1 is a block diagram illustrating a computer network in accordance with the present invention.

FIG. 1 is a block diagram illustrating a computer network 100, in accordance with the present invention. The computer network 100 includes a global server site 110 coupled via a computer network 155 (e.g., a local area network or the wide area network commonly referred to as the Internet) to a persistent client site 120, to a temporary client site 125, to a web site 130 and to a third party certificate authority 175.

The web site 130 represents an arbitrary server on the computer network 155 that provides data and/or services to a client site, only after identifying and authenticating the client (e.g. a user) and/or the client site based on a public key certificate and a private key installed on a client site. As illustrated, the web site 130 provides data and/or services to the persistent client site 120 and to the temporary client site 125. The web site 130 includes a secure communications engine 147 for using public/private key cryptography to identify and authenticate a client and to establish a secure communications channel with a client site 120 or 125. The web site 130 further includes a web site engine 153 for delivering web page data 150 to the connecting client site so that the client site 125 can present a web page (not shown) and access the services of the web site 130. Web page data 150 may include text, images, program services, applets, hypertext, etc. Upon generation of a secure communications channel with a client site 120 or 125, the web site engine 153 delivers web page data 150 via the secure communications channel to the connecting client site 120 or 125. Details of authentication protocols using public key certificates are discussed in an article entitled "The SSL Protocol, Version 3.0" published by the Netscape Communications Corporation on Nov. 18. 1996, which is hereby incorporated by reference.

The persistent client site 120 includes a configured web engine 135 for communicating with the web site 130, and includes a secure communications engine 180 for using public/private key cryptography to establish a secure communications channel with other sites, such as with the global server site 110 and/or with the web site 130, on the computer network 155. The client 120 is referred to as "persistent" because the user repeatedly uses it, and thus considers it a more permanent tool. The web engine 135 is referred to as "configured" because a long-term certificate 160 and long-term private key 165 (typically valid for a year term) have already been installed in the web engine 135 on the persistent client site 120. It will be appreciated that the long-term certificate 160 and long-term private key 165 have been installed in the web engine 135 because the client is a persistent client site 120. A configured web engine 135 is typically found on a user's desktop work computer, a user's desktop home computer, a user's laptop computer, a user's personal information manager such as a PalmPilot™ developed by U.S. Robotics, Inc., etc.

Since the persistent client site 120 is configured, other sites such as the web site 130 can identify the user of the persistent client site 120, and both the web site 130 (via the secure communications engine 147) and the persistent client site 120 (via the secure communications engine 180) can communicate securely without intervention by the global server site 110. Upon generation of the secure communications channel, the web site engine 153 will download web page data 150 via the secure communications channel to the configured web engine 135, which accordingly presents a web page (not shown).

The temporary client site 125, such as a computer terminal at a conventional kiosk, includes an unconfigured web engine 140 and a secure communications engine 185. The web engine 140 is referred to as "unconfigured" until a user's certificate and private key are installed in the web engine 140 on the temporary client site 125. The temporary client site 125 is referred to as "temporary" because the device is used infrequently or for a singe time and later used by others. Without a certificate or public key, other sites such as the web site 130 cannot identify the user by the aforementioned techniques described with respect to persistent clients 120. The web site 130 may prohibit the temporary client site 125 from obtaining its data 150 (including services) until the temporary client site 125 is configured.

Before the temporary client site 125 is configured, the secure communications engine 185 on the temporary client site 125 uses SSL or PCT technology to establish a private communications channel with the secure communications engine 190 on the global server site 110. SSL authenticates the server using its public key certificate. However, the identity of the user must be proven by some other means because no certificate and private key have been installed on the temporary client site. After the temporary client site 125 is configured, the secure communications engine 185 on the temporary client site 125 uses public/private key cryptography to establish a secure communications channel with other sites on the computer network 155, such as with the web site 130 identifying the user by the installed temporary certificate and private key.

The global server site 110 includes a temporary certificate server 115 for enabling the installation of a temporary certificate (400, illustrated and described in greater detail with reference to FIG. 4A) in the unconfigured web engine 140 on the temporary client site 125. The temporary certificate server 115 receives a temporary certificate installation request from the temporary client site 125, identifies and authenticates the user at the temporary client site 125, and accordingly delivers temporary certificate software (which is described in greater detail with reference to FIG. 3) to the temporary client site 125. The temporary client site 125 executes the temporary certificate software, which initiates the generation of a public/private key pair and a temporary certificate 400 and causes a temporary configuration of the unconfigured web engine 140. Generation of a temporary certificate 400 is described in greater detail with reference to FIG. 7. Installation of the temporary certificate 400 is described in greater detail with reference to FIG. 5.

It will be appreciated that the global server site 110 includes a private key 119 for digitally signing messages, including the temporary certificate 400, and includes a global server certificate 117 associating the global server site 110 with its well known public key. Although the global server site 110 is being described as a certificate authority, one skilled in the art will recognize that a third party certificate authority 175 such as VeriSign, Inc. of Mountain View, Calif. may sign the temporary certificate 400 on behalf of the global server site 110 (via a request from the global server site 110). As a second alternative, the third party certifying authority 175 can vouch for the global server site 110, so that the global server site 110 will be recognized as an approved certificate authority, which is conventionally referred to as "certificate chaining."

Figure 13:
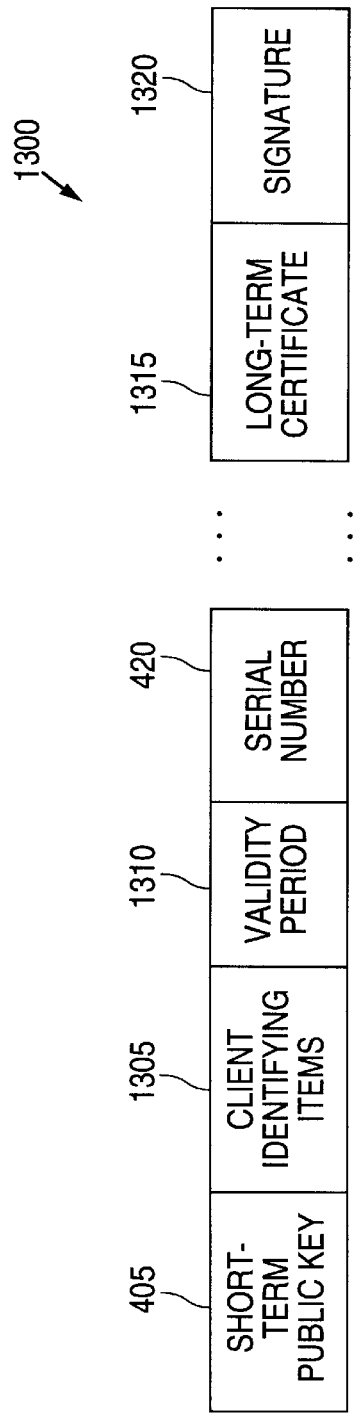
FIG. 13 is a block diagram illustrating a self-certified limited certificate.

As a third alternative, the global server site 110 can generate a self-certified limited certificate for the user, for installation on the temporary client site 125. A self-certified limited certificate is a certificate derived from a traditional public key certificate (such as certificate 160) and from its associated private key (such as private key 165). The self-certified limited certificate has the same identity (i.e., subject name), a different public key and a shorter validity period. A self-certified limited certificate is signed by the private key associated with the traditional public key certificate. An example self-certified limited certificate is illustrated in FIG. 13. When using this alternative, the user's private key and traditional certificate are stored on the global server site 110. The certificate authority's well-known public key is used to verify the certifying authority of the traditional certificate. The public key in the traditional certificate is used to verify the signature on the temporary certificate 400. Limited certificate generation is described in greater detail with reference to FIG. 11. A web site 130 can accept the self-certified limited certificate in lieu of the individual certificate. Use of a limited certificate is described in greater detail with reference to FIG. 12.

Whether the temporary certificate 400 is issued (i.e., signed) by the global server site 110, the third party certificate authority 175 or the individual certificate holder, the user can install the temporary certificate 400 in the client site and can contact any web site that recognizes the certifying authority of the temporary certificate 400.

Figure 2:
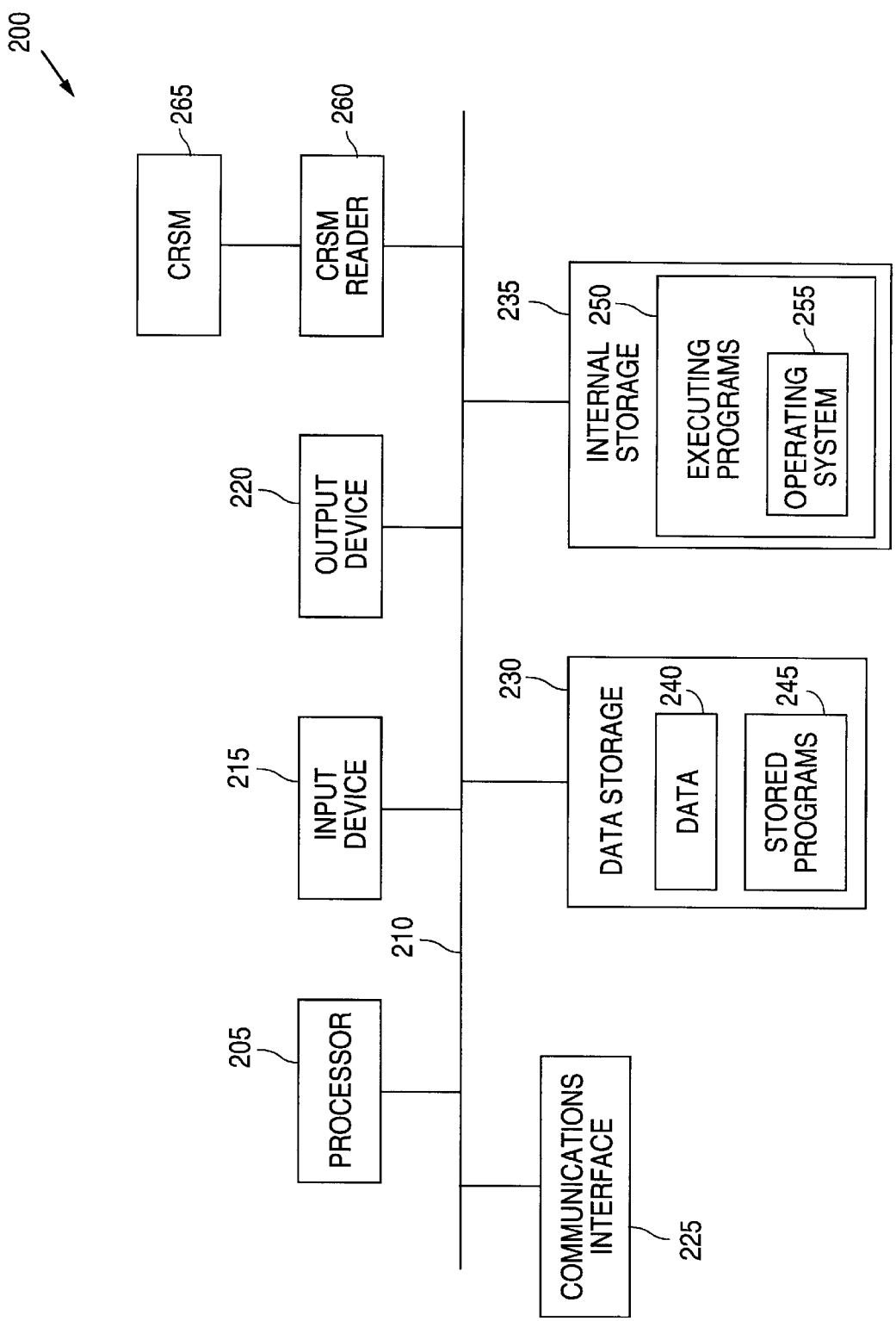
FIG. 2 is a block diagram illustrating details of a computer of FIG. 1.

FIG. 2 is a block diagram illustrating a computer system 200 which exemplifies the global server site 110, the persistent client site 120, the temporary client site 125, the third party certificate authority 175 and the web site 130. The computer system 200 includes a processor 205, such as an Intel Pentium® microprocessor or a Motorola Power PC® microprocessor, coupled to a communications channel 210. The computer system 200 further includes an input device 215 such as a keyboard and mouse, an output device 220 such as a Cathode Ray Tube (CRT) display, a communications interface 225, data storage 230 such as a magnetic disk, and internal storage 235 such as Random-Access Memory (RAM), each coupled to the communications channel 210.

The data storage 125 stores data 240 and stored programs 245. The internal storage 235 stores executing programs 235. With reference to the web site 130 (FIG. 1), an example of data 240 includes web page data 150, and examples of stored programs 245 or executing programs 250 include client identification engine 145 and secure communications engine 147. An operating system 255 controls processing by processor 205, and is typically stored in data storage 230 as a stored program 245 and loaded into internal storage 235 as an executing program 250 for execution by processor 205. Although the data 240, stored programs 245 and executing programs 250 are being described as wholly stored at a single location, one skilled in the art will recognize that different portions of the data 240, stored programs 245 and executing programs 250 may be stored at different sites.

One skilled in the art will recognize that the computer system 200 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 260 such as a magnetic disk drive, hard disk drive, magneto-optical reader, CPU, etc. may be coupled to the communications channel 210 for reading from a computer-readable storage medium (CRSM) 265 such as a magnetic disk, a hard disk, a magneto-optical disk, RAM, etc. Accordingly, the computer system 200 may receive programs and data via the CRSM reader 260.

Figure 3:
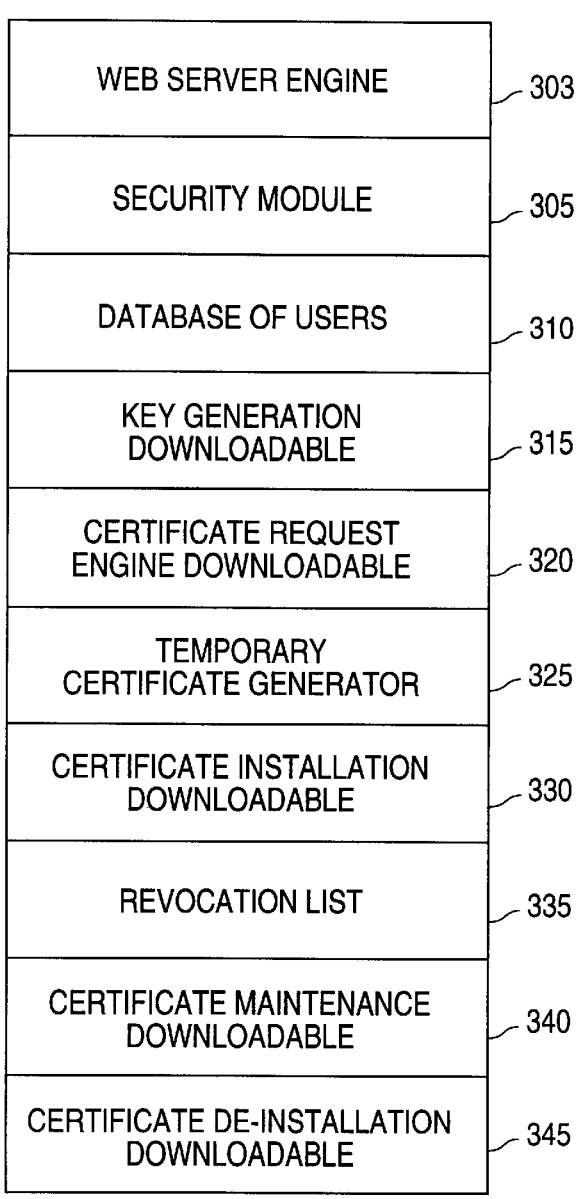
FIG. 3 is a block diagram illustrating details of a temporary certificate server of FIG. 1.

FIG. 3 is a block diagram illustrating details of the temporary certificate server 115. The temporary certificate server 115 includes a web server engine 303, a security module 305, a database of users 310, a key generation downloadable 315, a certificate request engine downloadable 320, a temporary certificate generator 325, a certificate installation downloadable 330, a revocation list 335, a certificate maintenance Downloadable 340 and a certificate de-installation Downloadable 345. A Downloadable is any program code that is downloaded from a remote site that can be executed or interpreted on a local site. Examples of Downloadables include applets for use in the Java™ distributed environment developed by Sun Microsystems, Inc., ActiveX™ control for use in the ActiveX™ distributed environment developed by the Microsoft Corporation, plugins, etc.

The web server engine 303 receives and responds to requests from connecting clients, acting as the application program interface with the clients. Operation of the web server engine 303 will be described in greater detail with reference to the modules below.

After the secure communications engine 185 on the temporary client site 125 establishes a private channel with the secure communications engine 190 on the global server site 110, the temporary client site 125 sends a request for temporary configuration to the web server engine 303. The global server site 110 receives the request. Accordingly, the security module 305 examines security information such as a login and password, a response to a challenge, a time-synchronous currently displayed key on an authentication token such as a secure ID card by Security Dynamics, etc. to confirm the privileges of the connecting temporary client site 125 to access the contents and functionality of the global server site 110, and more particularly to access the contents and functionality of the temporary certificate server 115. The security information, including identification and authentication information, distinguished name and usage log for each privileged user, is contained in the database of users 310. For the third alternative, the traditional certificate and private key may also be stored in the database of users 310.

Upon confirming user privileges, the web server engine 303 responds to a request for temporary configuration. An example request 450 is illustrated in FIG. 4B. Upon request from the temporary client site 125, the web server engine 303 downloads global server web page data including the key generation downloadable 315, the certificate request engine Downloadable 320, the certificate installation downloadable 330, the certificate maintenance downloadable 340 and the certificate de-installation downloadable 345 to the temporary client site 125. Requesting and downloading Downloadables are described in greater detail with reference to FIG. 6. The Downloadables are described in greater detail below.

The key generation downloadable 315 includes code for causing a web engine, e.g., the unconfigured web engine 140, to generate a public/private key pair. The key generation downloadable 315 may include an applet for use in the Java™ distributed environment developed by Sun Microsystems, Inc., an Active™ control for use in the ActiveX™ distributed environment developed by the Microsoft Corporation, a plugin, etc. Considerable processing time is needed to generate public and private key pairs. It will be appreciated that, since the key pair is useful only for the life of the temporary certificate 400, a shorter key length may be used in comparison to certificates that must be valid for longer time spans. The unconfigured web engine 140 on the temporary client site 125 executes the key generation Downloadable 315. Accordingly, the key generation downloadable 315 generates temporary public and private keys for the temporary client site 125. It will be appreciated that, since the system 100 transmits only a key generation downloadable 315 and not a private key across the computer network 155, the system 100 does not compromise the private key by network transfer. Although key generation is preferably performed on the temporary client site 125, key generation may be performed on the global server site 110 and downloaded to the temporary client site 125 protected by some security means such as a password or SSL session.

The certificate request engine downloadable 320 includes code for causing a web client, e.g., web engine 140, to request the global server site 110 to generate a temporary certificate 400. The unconfigured web client 140 on the temporary client site 125 executes the certificate request engine Downloadable 320. The certificate request engine Downloadable 320 packages all information needed including the public key generated by the key generation downloadable 315 and a requested duration into the certificate request, and forwards the request to the temporary certificate generator 325 for temporary certificate generation. FIG. 4B is a block diagram illustrating a certificate request 450. The request 450 includes a temporary public key 405, a requested duration 460 and a signature 465. The signature 465 proves that the requester has the temporary private key associated with the temporary public key in the request 450.

The temporary certificate generator 325 packages the public key, the subject name such as the distinguished name of the client stored in the database of users, a validity period (e.g., a start and end time), issuer name and other information into an envelope. The validity period will be restricted to begin no earlier than a universal current time on the global server site 110 and to have a maximum duration possibly set by the user. The maximum duration should be short, for example, 24 hours, one week, two weeks, etc. but should not exceed the traditional validity term of one year.

The temporary certificate generator 325 digitally signs the envelope, thereby generating the signed temporary certificate 400. FIG. 4A is a block diagram illustrating an example temporary certificate 400, which includes a public key 405, a subject name 410, a validity period 415, a serial number 420 and a global server signature 425. Although not shown, the certificate 400 may include other information such as that used by certificates complying with the X.500 Version 3.0 in CCITT, Recommendation X.509: "The Directory—Authentication Framework" 1988 by J. Postel and J. Reynolds cited on page 57 of the incorporated reference entitled "The SSL Protocol, Version 3.0. Referring again to FIG. 3, it will be appreciated that the temporary certificate generator 325 may use the global server's private key 119 to digitally sign the envelope. It will be further appreciated that the temporary certificate generator 325 may use a Public Key Certificate Standard (PKCS), such as PKCS-7, and may use the Abstract Syntax Notation (ASN) distinguished coding practices. The temporary certificate generator 325 forwards the signed temporary certificate 400 to the requesting client.

The certificate installation downloadable 330 includes code for causing a web client, such as web engine 140, to install the temporary certificate 400 so that the web engine 140 will provide a temporary certificate 400 to all confirmed requesting parties. The certificate installation downloadable 330 includes an Application Program Interface (API) for communicating with the particular web engine 140. For example, if the web engine 140 includes the Netscape Navigator™ web browser developed by the Netscape Corporation, then an API for communicating with the Netscape Navigator™ web browser is needed. If the client supports a SmartCard reader, the API may install a virtual SmartCard driver and may install the certificate virtually on the driver. Now the temporary client site 125 is temporarily configured and can operate without further interaction with the global server site 110 for the duration of the temporary certificate 400.

The certificate maintenance downloadable 340 includes code for causing the temporary client site to monitor the validity period of the temporary certificate 400 for expiration. Monitoring current time may include communicating with an atomic clock on the global server site 110 or may include adjusting for time variations between the temporary client site 125 and the global server site 110. Just prior to expiration of the temporary certificate 400, the certificate maintenance downloadable 340 re-requests identification and authentication information from the user. Upon confirmation of user identification and authentication, the temporary certificate generator 325 reissues a new temporary certificate 400 which may require re-generation of a new public/private key pair, etc. or just updating the start/end time 415 to extend the validity period. It will be appreciated that to maintain a temporary certificate, the user may be requested to hit a "Continue?" pop-up button and input of identification and authentication information. The certificate installation downloadable 330 installs the reissued temporary certificate 400 in the web engine 140.

The certificate de-installation downloadable 345 includes code for causing a the web engine 140 to de-install a temporary certificate 400 after the user has finished with the temporary client site 125. The certificate de-installation downloadable 345 removes the temporary certificate 400 and the private key from the web engine 140, and sends the certificate 400 or at least the serial number 420 of the certificate 400 to the certificate authority maintaining the revocation list 335, which contains information identifying all unexpired temporary certificates 400 to be considered no longer valid. In this embodiment, the certifying authority is the global server site 110, and thus the information is sent to the web server engine 303. The web server engine 303 stores the certificate 400 or serial number 420 in the revocation list 335. If the certifying authority is a third party certificate authority 175, revocation of a temporary certificate 400 is communicated to the third party certificate authority 175 (possibly via the global server site 110) so that a proper revocation list 335 can be maintained at that third party certificate authority 175. If the temporary certificate is a self-certified limited certificate (see FIGS. 10–13), then the revocation list may be managed by the certificate authority issuing the long-term certificate.

A web site 130 that was contacted by a client 125 using a temporary certificate 400 asks the web server engine 303 to download the certificate revocation list 335. By reviewing the revocation list 335, the web site 130 can determine if the temporary certificate 400 being used has already been revoked. For efficiency, the web site 130 may only download a revocation list 335 if the revocation list 335 on the global server site 110 has been updated since the last download. After a temporary certificate 400 expires, the web server engine 303 may remove it from the revocation list 335. Because the temporary certificates 400 quickly expire (e.g., between five minutes and 24 hours) and are removed from the revocation list 335 upon expiration, the revocation lists 335 will not become very long.

Figure 5:
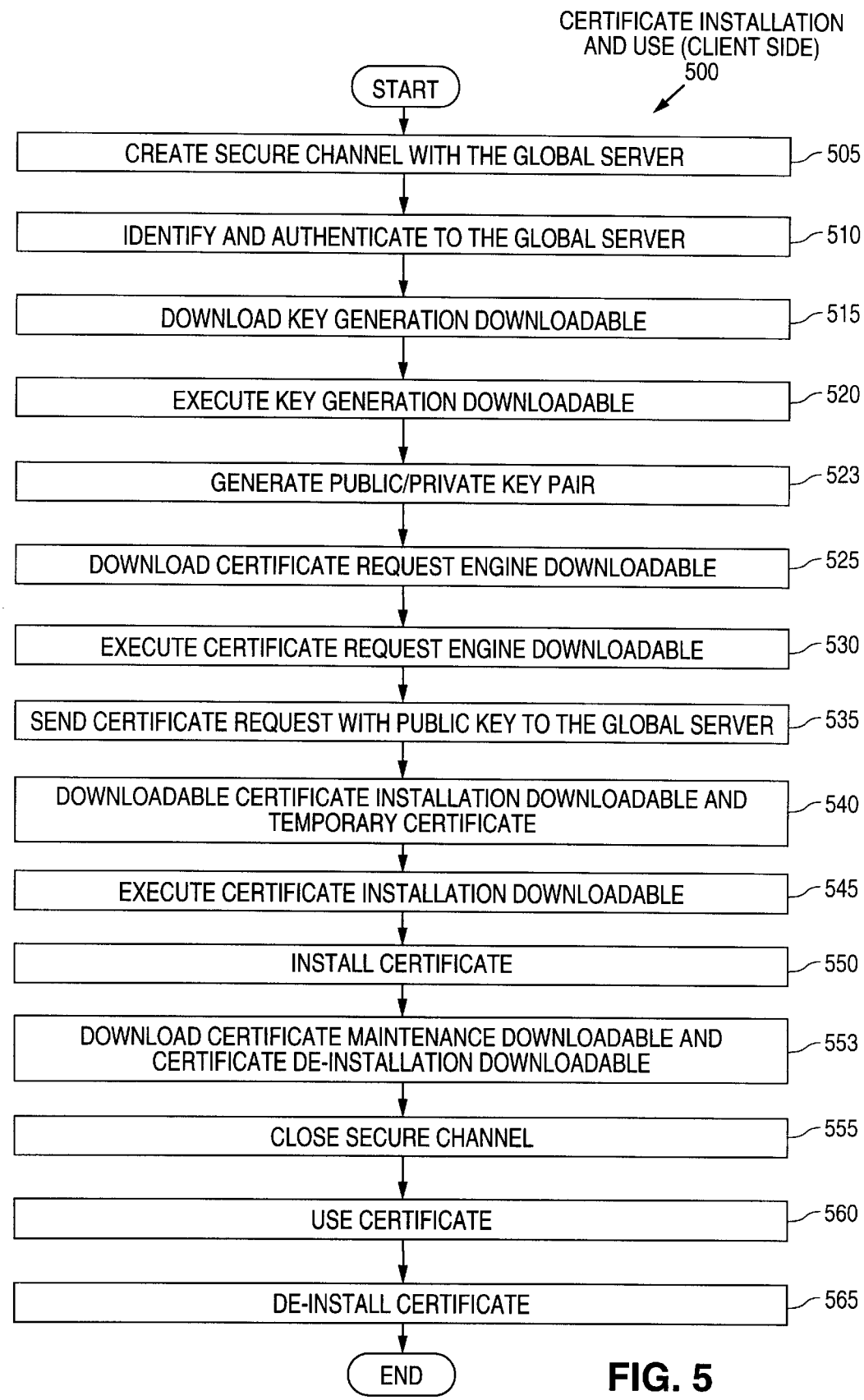
FIG. 5 is a flowchart illustrating a client method of installing and using a temporary certificate in accordance with the present invention.

FIG. 5 is a flowchart illustrating a client method 500 for generating, installing and using a temporary certificate 400 at the temporary client site 125. Method 500 begins by the temporary client site 125 in step 505 creating a private channel with the global server site 110. Creating a private channel may include using SSL or PCT technology. In response to a request by the security module 305 of the global server site 110, the unconfigured web engine 140 in step 510 delivers identification and authentication information to the global server site 110, possibly, by requesting login and password information from a user or by requesting a response to a challenge from a user having a hand-held authentication token such as AuthentiCard™ authentication token developed by Vasco Corporation of Lombard, Ill. or by entering the number currently displayed on time-synchronized identification and authentication system such as SecureID from Security Dynamics, and forwarding the information or response to the security module 305. It will be appreciated that because of the global server certificate 117 on the global server site 110, the temporary client site 125 can strongly identify the global server site 110. However, the global server site 110 cannot yet identify the currently unconfigured temporary client site 125.

Upon identification and authentication, the unconfigured web engine 140 in step 515 downloads and in step 520 executes a key generation downloadable 315 from the global server site 110. The key generation downloadable 315 in step 523 generates a public/private key pair. The unconfigured web engine in step 525 downloads and in step 530 executes a certificate request engine downloadable 320 from the global server site 110. The certificate request engine downloadable 320 in step 535 sends a certificate request 450 having the public key generated by the key generation downloadable 315 to the temporary certificate generator 325 of the global server site 110. An example certificate request 450 is shown in FIG. 4B.

The unconfigured web engine 140 in step 540 downloads from the global server site 110 a certificate installation downloadable 330 and a temporary certificate 400 generated by the temporary certificate generator 325. The unconfigured web engine 140 in step 545 executes the certificate installation downloadable 330, which in step 550 installs the temporary certificate 400 and the previously generated private key in the unconfigured web engine 140, thereby creating a temporarily configured web engine 140. The web engine 140 in step 553 downloads the certificate maintenance downloadable 340 and the certificate de-installation Downloadable 345. It will be appreciated that all these separate downloadables may be combined into a single downloaded program module. The secure communications engine 185 on the temporary client site 125 in step 555 sends a request to close the secure channel with the secure communications engine 190 on the global server site 110.

Accordingly, the temporarily configured web engine 140 in step 560 executes the certificate maintenance Downloadable 340 and uses the temporary certificate and private key to communicate with web sites 130. Either after expiration of the temporary certificate or upon receipt of a user's asynchronous logout request, the web engine 140 in step 565 executes the certificate de-installation Downloadable thereby de-installing the temporary certificate. It will be appreciated that expiration of the temporary certificate and receipt of a user logout request will be recognized by the certificate maintenance Downloadable being executed by the temporarily configured web engine 140. Method 500 then ends.

Figure 6:
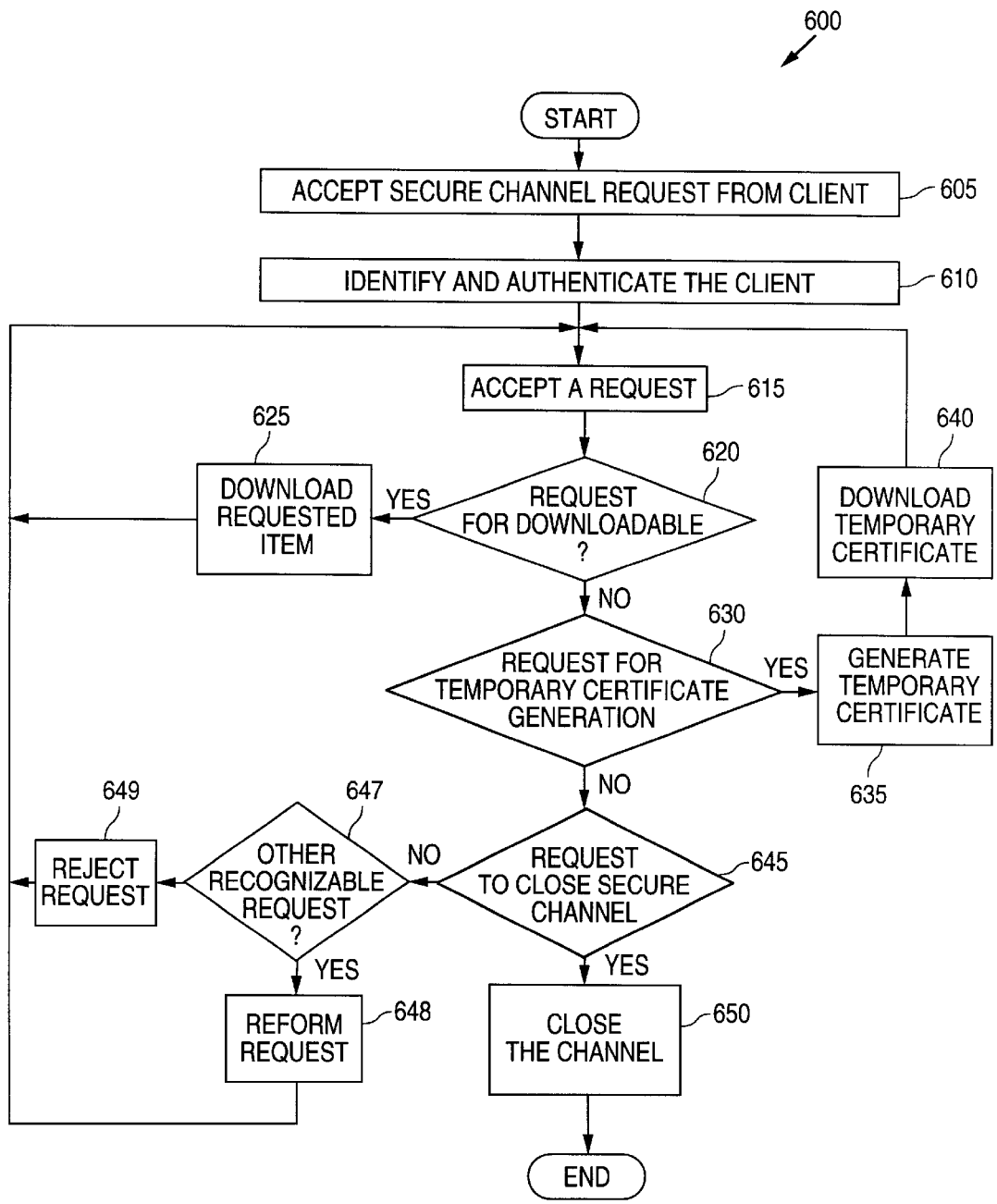
FIG. 6 is a flowchart illustrating a global server method of installing a temporary certificate in accordance with the present invention.

FIG. 6 is a global server method 600 for installing a temporary certificate 400 in an unconfigured web engine 140 in accordance with the present invention. Method 600 begins with the secure communications engine 310 in step 605 accepting a secure channel request from the connecting client, e.g., the secure communications engine 185 of the temporary client site 125. The security module 305 in step 610 identifies and authenticates the client at the temporary client site 125, possibly by requesting login and password information or by requesting a response to a challenge.

Upon identification and authentication, the web server engine 303 in step 615 accepts a request from the unconfigured web engine 140 on the temporary client site 125. In step 620, the web server engine 303 determines if the request includes a request for a Downloadable. If so, then the web server engine 303 in step 625 retrieves the requested item and downloads it to the unconfigured web engine 140. Method 600 then returns to step 615. The Downloadable may include the key generation downloadable 315, the certificate request engine Downloadable 320, the certificate installation Downloadable 330, the certificate maintenance Downloadable 340, the certificate de-installation Downloadable 345, or combinations of the above.

If the request received is not a request for a Downloadable, then the web server engine 303 in step 630 determines whether the request included a request for temporary certificate generation. If so, then the temporary certificate generator 325 in step 635 generates a temporary certificate 400 by packaging the necessary information from the request 450 and from the database of users 310 into a container and signing the container, as described in greater detail above with reference to FIG. 4A and below with reference to FIG. 7. The web server engine 303 in step 640 downloads the temporary certificate 400 to the unconfigured web engine 140, and returns to step 615.

If the request was not a request for temporary certificate generation, then the web server engine 303 in step 645 determines if the request includes a request to close the secure channel. If so, then the secure communications engine 190 in step 650 closes the channel, and method 600 then ends. Otherwise, the web server engine 303 in step 647 determines if the request includes some other recognizable request. If recognized, then the web server engine 303 in step 648 performs the request and returns to step 615. If unrecognized, the web server engine 303 in step 649 rejects the request and returns to step 615.

Figure 4A:
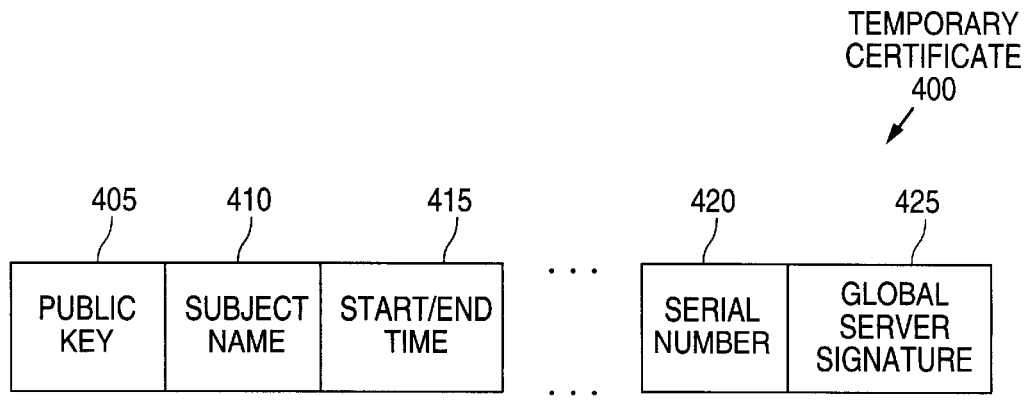
FIG. 4A is a block diagram illustrating details of a temporary certificate.
Figure 4B:
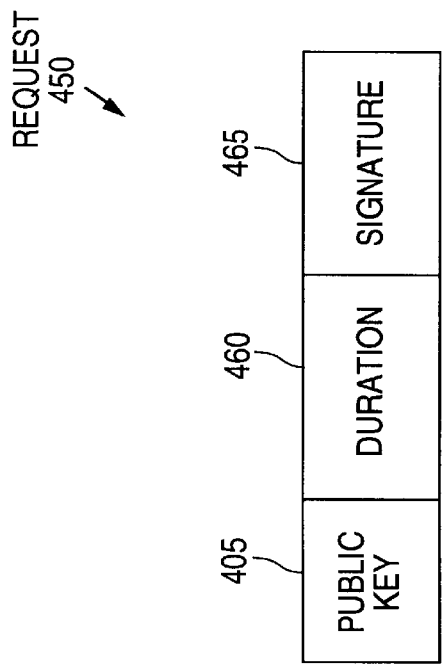
FIG. 4B is a block diagram illustrating details of a request for a temporary certificate.
Figure 7:
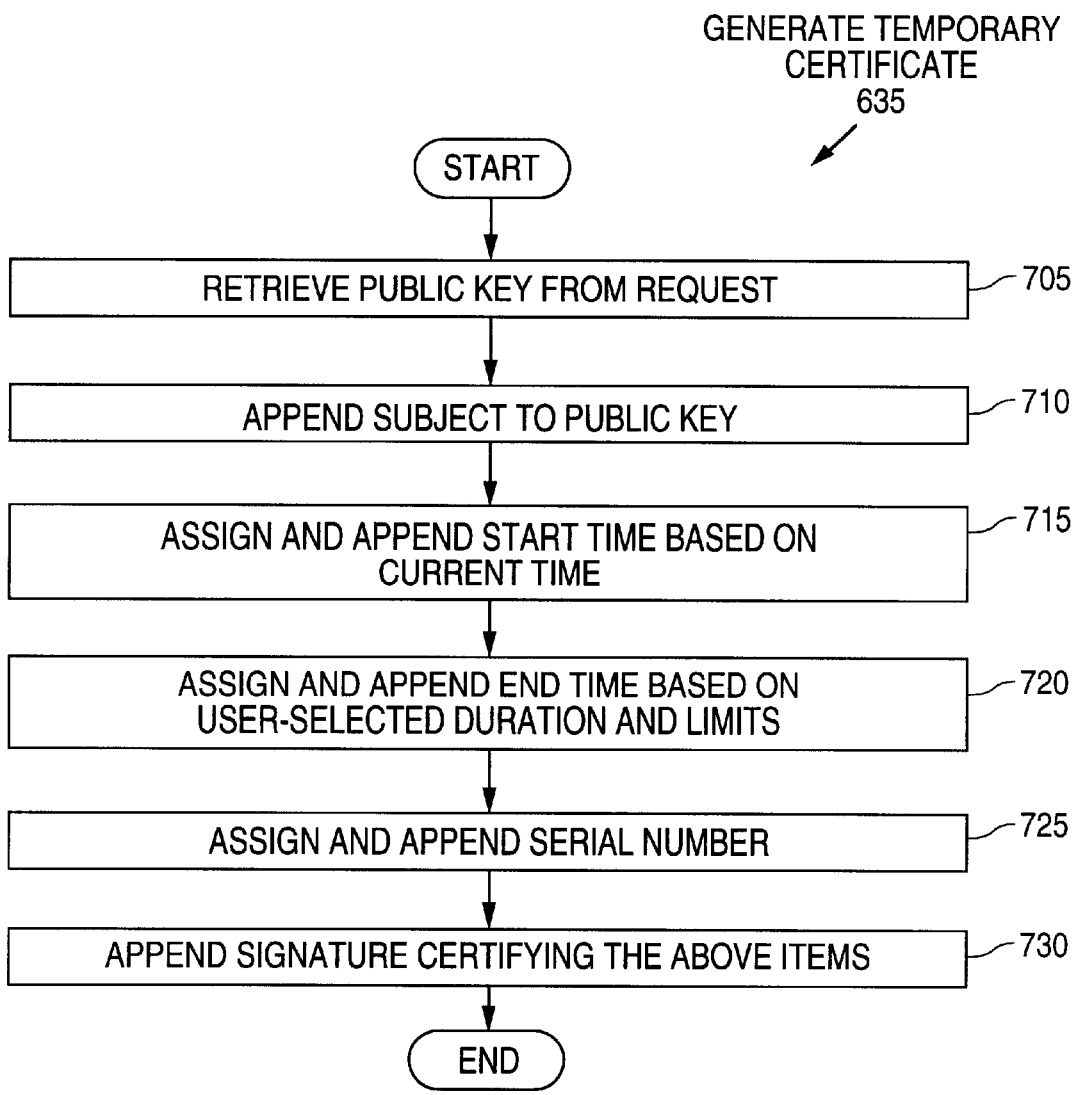
FIG. 7 is a flowchart illustrating a method of generating a temporary certificate.

FIG. 7 is a flowchart illustrating details of a method 635 for generating a temporary certificate 400, as illustrated in FIG. 4A. Method 635 begins with the temporary certificate generator 325 in step 705 retrieving the public key 405 from the temporary certificate generation request 450. The temporary certificate generator 325 in step 710 appends the subject name 410, retrieved from the database of users 310, to the public key 405. The temporary certificate generator 325 in step 715 assigns and appends a start time 415 based on the current time, and in step 720 assigns and appends an end time 415 based on the user-selected duration 460 and on previously configured validity period limits (not shown). The temporary certificate generator 325 in step 725 assigns and appends a serial number 420 to the public key 405. The temporary certificate generator 325 in step 730 appends the signature 425 certifying the authenticity of the above items. It will be appreciated that appending the certifying signature 425 may include using the global server private key 119 to sign the package. One skilled in the art will recognize that the temporary certificate 400 may contain other data items, and may comply with the X.500 standard. Method 635 then ends.

Figure 8:
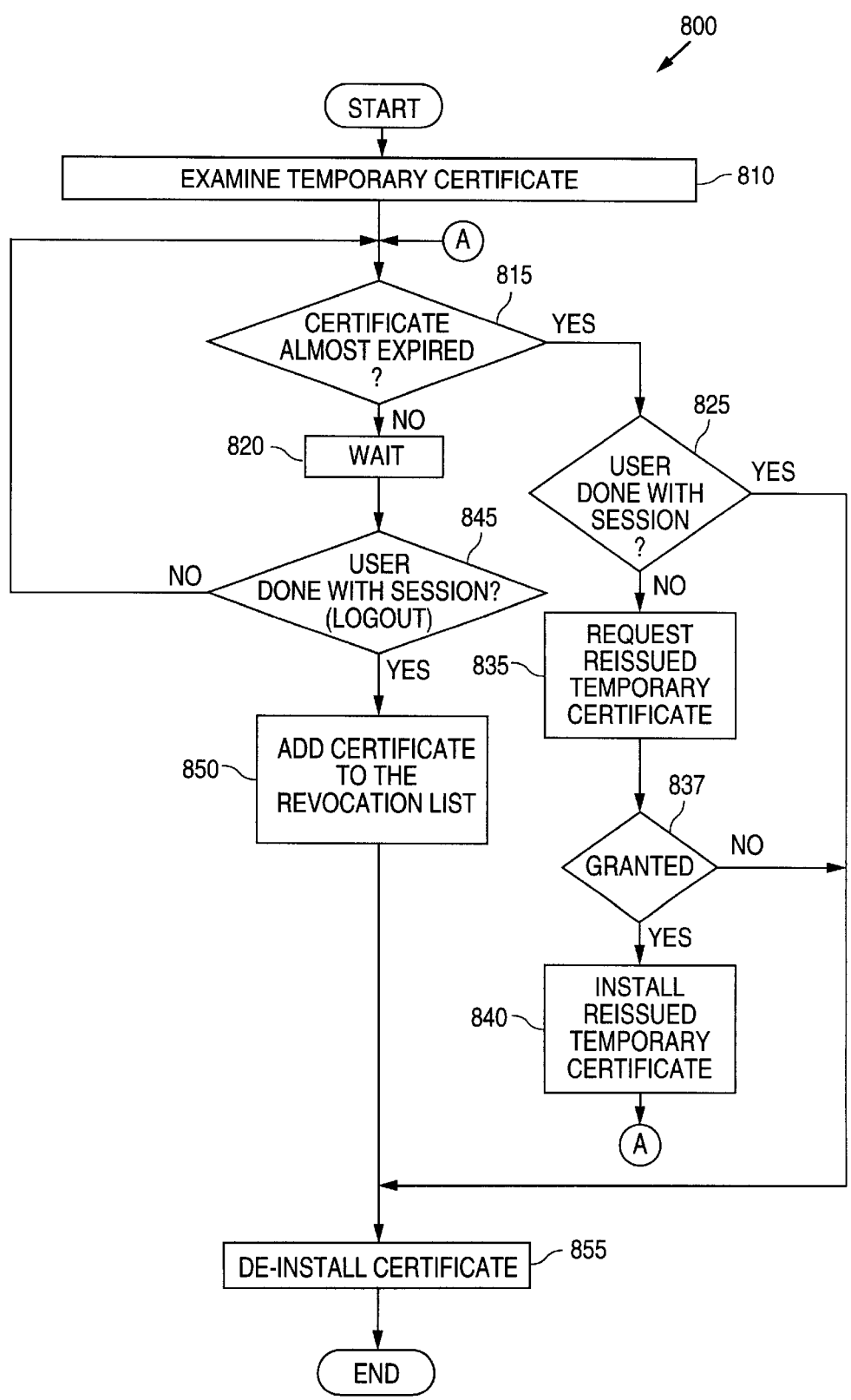
FIG. 8 is a flowchart illustrating a method of managing the temporary certificate of the present invention.

FIG. 8 is a flowchart illustrating a client method 800 for managing a temporary certificate 400 in accordance with the present invention. Method 800 begins with the certificate maintenance Downloadable 340 operating on the client 125 in step 810 examining the temporary certificate 400. The certificate maintenance Downloadable 340 in step 815 monitors the start/end time 415, i.e., the validity period, of the temporary certificate 400 to determine whether it has almost expired. For example, a temporary certificate 400 has almost expired when it is within a predetermined time period (e.g., 30 seconds) from the end time 415.

If the certificate maintenance Downloadable has determined that the temporary certificate 400 has almost expired, the certificate maintenance downloadable 340 in step 825 determines whether the user is done with the session, preferably, by asking the user. If the user is done, then the certificate maintenance Downloadable 345 in step 855 de-installs the temporary certificate 400 and method 800 ends. If the user is not done, then the certificate maintenance Downloadable 340 in step 835 requests a new or re-issued temporary certificate 400 from the global server site 110. Requesting a re-issued temporary certificate is similar to requesting an original temporary certificate 400. However, the Downloadables need not be downloaded again. That is, a request will look like request 450 (FIG. 4B), and step 835 may include creating a secure channel with the global server 110 (step 505, FIG. 5), transmitting identification and authentication information to the global server 110 (step 510, FIG. 5), executing the certificate request engine Downloadable 320 (step 530, FIG. 5), and sending the certificate request to the global server 110 (step 535, FIG. 5). For housekeeping and other purposes, the certificate request engine Downloadable 320 may also send the original temporary certificate 400 to the global server 110. Generating a re-issued certificate is discussed in greater detail with reference to FIG. 10. If the global server site 110 in step 837 grants the request, the certificate maintenance Downloadable 340 in step 840 installs the new or re-issued temporary certificate 400, and method 800 then returns to step 815.

Step 840 may include executing the certificate installation Downloadable 330 (step 540, FIG. 5), installing the certificate (step 550, FIG. 5), and closing the secure channel (step 555, FIG. 5). If the certificate re-issue request is not granted, the method 800 jumps to step 855.

If the temporary certificate 400 has not almost expired, then the certificate maintenance Downloadable in step 820 waits. The certificate maintenance Downloadable 340 in step 845 determines if the user is done with the session. If not, then the method 800 returns to step 815. Otherwise, the certificate maintenance Downloadable 340 in step 850 adds the temporary certificate 400 to the revocation list 335 and proceeds to step 855.

Figure 9:
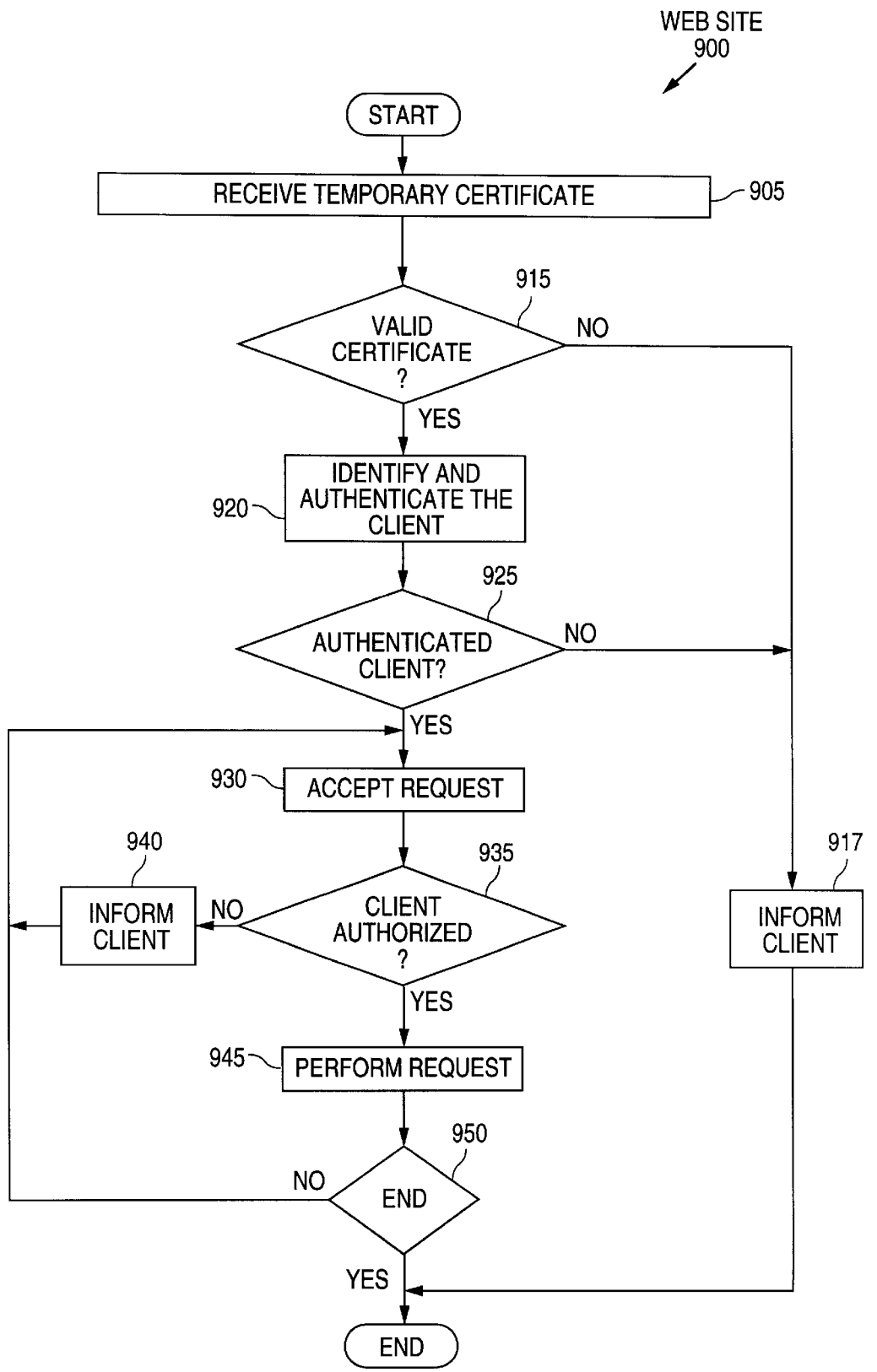
FIG. 9 is a flowchart illustrating a method of examining a temporary certificate before performing a client request, in accordance with the present invention.

FIG. 9 is a flowchart illustrating a web site method 900 for examining a temporary certificate 400 before authorizing performance of a client request, in accordance with the present invention. Method 900 begins with the secure communications engine 147 on the web site 130 in step 905 receiving a temporary certificate 400. The secure communications engine 147 in step 915 verifies the validity of the certificate 400. Verifying the validity of a temporary certificate is illustrated in FIG. 13. If the secure communications engine 147 in step 915 determines that the temporary certificate 400 is invalid, then the secure communications engine 147 in step 917 informs the user of the failure. Method 900 then ends.

If the secure communications engine 147 in step 915 determines that the certificate 400 is valid, then the secure communications engine 147 in step 920 identifies and authenticates the client. If the secure communications engine 147 in step 925 does not authenticate the client, then the method jumps to step 917. Otherwise, the web site engine 153 in step 930 accepts requests from the client site 125.

The web site engine 153 in step 935 determines whether, based on the valid certificate 400, the client on the client site 125 is authorized to have the request performed. If the client is not authorized, then the web site engine 153 in step 940 informs the client of the failure and method 900 returns to step 930. If the client is authorized, then the web site engine 153 in step 945 performs the request, e.g., provides the necessary web page data 150 or results to the client site 125. The secure communications engine 147 determines whether to end the session. Determining whether to end the session is similar to method 800 described with reference to FIG. 8. That is, the secure communications engine 147 determines if the temporary certificate 400 has expired or whether the user has logged out. Monitoring the current time to determine if the temporary certificate 400 has expired may include communicating with an atomic clock on the global server site 110. If ending the session, method 900 ends. Otherwise, method 900 then returns to step 930.

Figure 10:
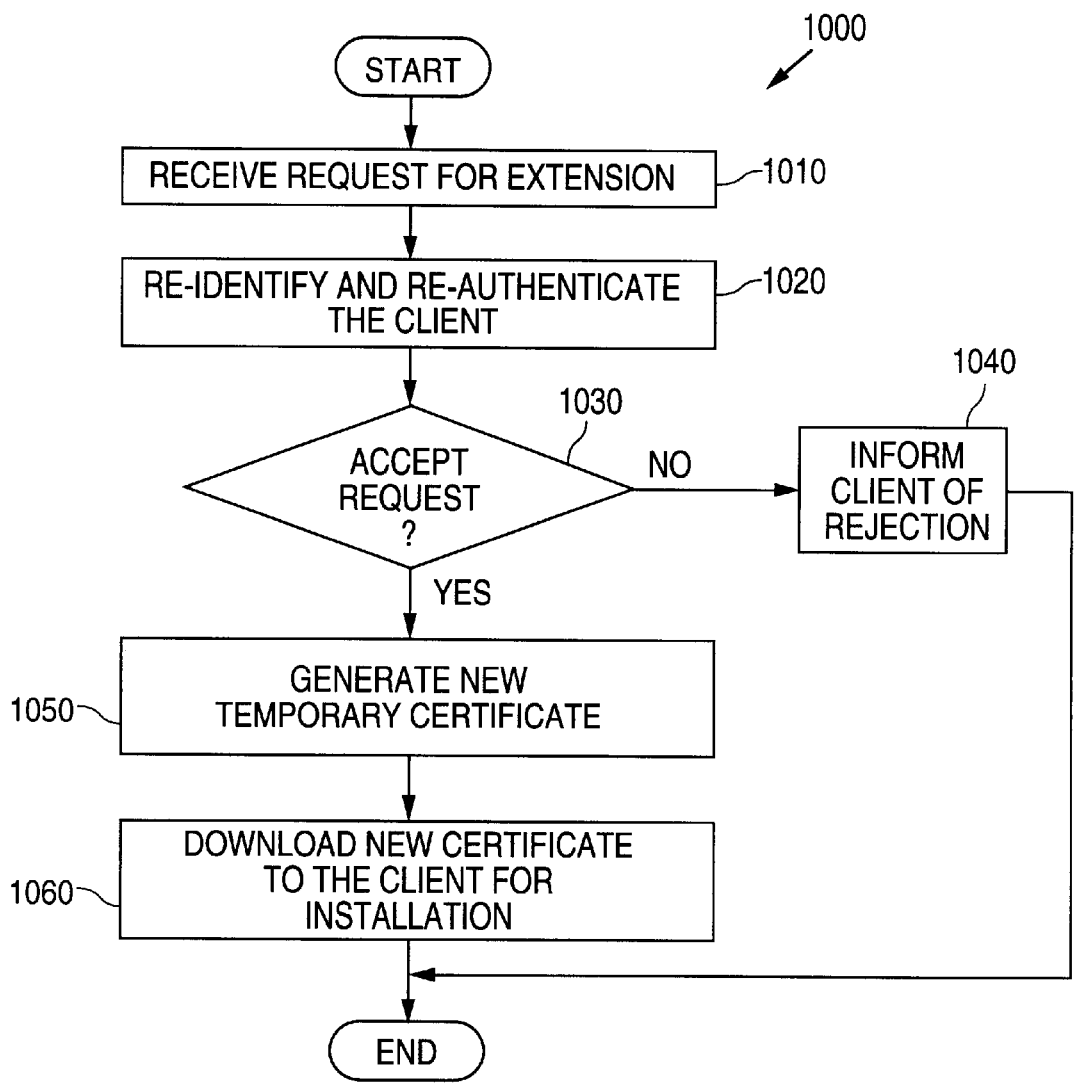
FIG. 10 is a flowchart illustrating a method of reissuing a temporary certificate.

FIG. 10 is a flowchart illustrating a method 1000 of re-issuing a temporary certificate 400. Method 1000 begins with the temporary certificate server 115 in step 1010 receiving a request for extension. The temporary certificate server 115 in step 1020 re-identifies and re-authenticates the client, and in step 1030 determines whether to accept the request. Determining whether to accept the certificate re-issue request may include determining whether the user has configured the temporary certificate server 115 to allow updates, determining whether the frequency of updates is within user-selected or predetermined limits, determining whether the duration requested is within user-selected or predetermined limits, etc.

If the request is denied, the temporary certificate server 115 in step 1040 informs the client, and method 1000 ends.

If the request is accepted, then the temporary certificate server 115 in step 1050 generates a re-issued temporary certificate (same subject name, same public key, same serial number, different validity period, different global server signature) and in step 1060 downloads the re-issued certificate to the client site 125 for installation. It will be appreciated that, if re-issuing a temporary certificate is not available, then re-generating a temporary certificate would be necessary (which may include regenerating a new pubic and private key pair, etc.). Method 1000 then ends.

Figure 11:
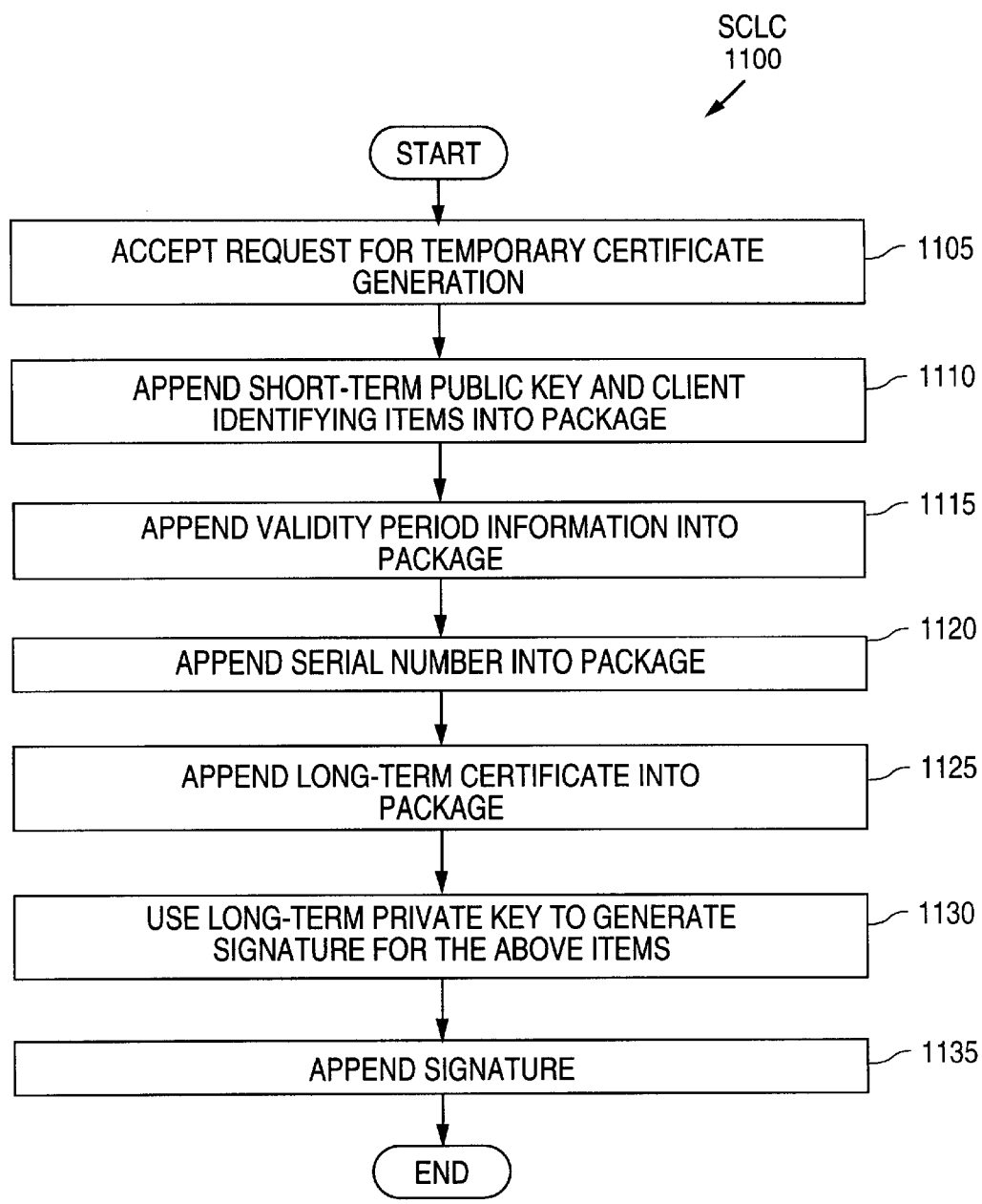
FIG. 11 is a flowchart illustrating a method of installing a self-certified limited certificate.

FIG. 11 is a flowchart illustrating a method 1100 of installing a self-certified limited certificate, as illustrated in FIG. 13. Method 1100 begins with the temporary certificate server 115 in step 1105 accepting a request to generate a temporary certificate 400. The temporary certificate server 115 in step 1110 appends the short-term public key 405 received in the request 450 and client identifying items (e.g., subject name 410) retrieved from the database of users 310 into a package. The temporary certificate server 115 in step 1115 appends validity period information (e.g., start/end time 415) based on the duration 460 in the request 450, the validity period of the long-term certificate and predetermined limits into the package. For identification purposes, the temporary certificate server 115 in step 1120 assigns a serial number 420 and appends it into the package. The temporary certificate server 115 in step 1125 retrieves the long-term public certificate (such as certificate 160) associated with the requesting user from the database of users 310, and appends the long-term certificate into the package. The temporary certificate server 115 in step 1130 retrieves the long-term private key (such as private key 165) associated with the long-term certificate from the database of users 310, and uses the private key to generate a signature for the items appended the package. The temporary certificate server 115 in step 1135 appends the signature to the package, and method 1100 ends.

Figure 12:
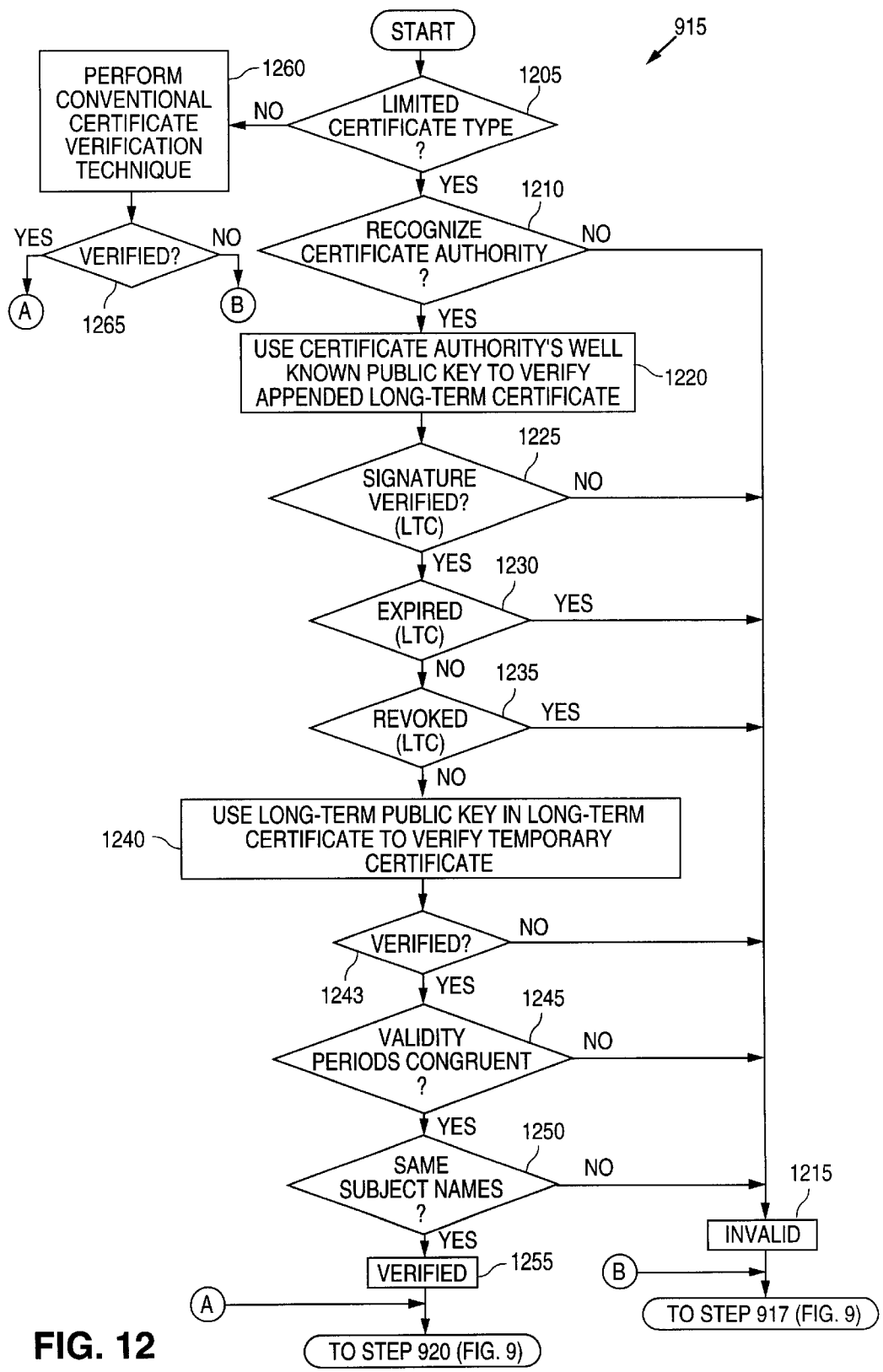
FIG. 12 is a flowchart illustrating a method of using the self-certified limited certificate of FIG. 11.

FIG. 12 is a flowchart illustrating a method for verifying the authenticity, integrity and origin of a temporary certificate 400, including a self-certified limited certificate. Method 915 begins with the secure communications engine 147 on the web site 130 in step 1205 determining whether the temporary certificate 400 (FIG. 4A) or 1300 (FIG. 13) is a self-certified limited certificate 1300. If so, then the secure communications engine 147 in step 1210 determines whether it recognizes the certificate authority signing the appended long-term certificate 1315. If unrecognized, then the secure communications engine 147 in step 1215 determines that the temporary certificate 1300 is invalid, and method 915 proceeds to step 917 (FIG. 9).

If the certificate authority is recognized, then the secure communications engine 147 in step 1220 uses the certificate authority's well-known public key to verify the signature of the appended long-term certificate 1315. The secure communications engine 147 in step 1225 determines whether the signature of the long-term certificate 1315 has been verified. If not, then method 915 returns to step 1215. Otherwise, the secure communications engine 147 in step 1230 determines whether the long-term certificate 1315 has expired. If not, then method 915 returns to step 1215. Otherwise, the secure communications engine 147 in step 1235 determines whether the long-term certificate 1315 has been revoked. Determining long-term certificate revocation typically includes downloading a long-term certificate revocation list (not shown) from the certificate authority signing the long-term certificate 1315. If revoked, then method 915 returns to step 1215.

If verified, unexpired and unrevoked, then the secure communications engine 147 in step 1240 uses the long-term public key in the long-term certificate 1315 to verify the signature of the temporary certificate 1300. If in step 1243 the secure communications engine 147 determines that the signature does not verify, then method 915 returns to step 1215. Otherwise, the secure communications engine 147 in step 1245 determines whether the validity period 1310 of the selfcertified limited certificate 1300 is within the validity period (not shown) of the long-term certificate 1315. If not, then method 915 returns to step 1215. If so, then the secure communications engine 147 in step 1250 determines whether the self-certified certificate 1300 and long-term certificate have the same subject. If not, then the method 915 returns to step 1215. Otherwise, the secure communications engine in step 1255 authenticates the certificate 1300, and proceeds to step 920 (FIG. 9).

If the secure communications engine 147 in step 1205 determines that the received temporary certificate 400 or 1300 is not a limited certificate 1300, then the secure communications engine 147 in step 1260 performs conventional certificate verification techniques, and in step 1265 determines whether the certificate 400 has been authenticated. If so, then method 915 proceeds to step 920 (FIG. 9). If not, then method 915 proceeds to step 917 (FIG. 9).

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. Although the certificate installation, maintenance, etc. software have been described as Downloadables, one skilled in the art will be aware that these modules may be a part of a web engine on the temporary client. Further, components of this invention may be implemented using a programmed general purpose digital computer, using application specific integrated circuits, or using a network of interconnected conventional components and circuits. Connections may be wired, wireless, modem, etc. Although the system of the present invention is being described with reference to an atomic clock on the global server site 110, any atomic clock such as the U.S. Navy Master Clock may alternatively be accessed. The invention will still operate without an atomic clock while using larger validity periods and depending more on revocation lists. Although we have described the present invention for SSL, PCT and other session-oriented protocols, the techniques can be easily adapted to non-session protocols such as S/MIME and S/PAY which use public key certificates. The embodiments described herein are not intended to be exhaustive or limiting. The present invention is limited only by the following claims.

What is claimed is:

1. A computer-based method for installing a temporary certificate on a client site, comprising the steps of:

receiving a public key from a client site;

generating a temporary certificate containing the public key and a validity period; and delivering the temporary certificate and a certificate installation downloadable to the client site, thereby enabling installing of the certificate on the client site without requiring network transfer of a client private key.

2. The method of claim 1, wherein the client site is unconfigured.

3. The method of claim 1, wherein the certificate installation downloadable includes code for causing the client site to install the temporary certificate in a web engine.

4. The method of claim 3, wherein the certificate installation downloadable includes an application program interface for communicating with the web engine.

5. The method of claim 1, further comprising the step of identifying and authenticating the user at the client site before generating the temporary certificate.

6. The method of claim 1, further comprising the step of establishing a secure channel with the client site before downloading the temporary certificate.

7. The method of claim 1, further comprising the step of forwarding to the client site a key generation downloadable for causing the client site to generate the public key and an associated private key.

8. The method of claim 7, further comprising the step of receiving a validity period duration request.

9. The method of claim 8, wherein the temporary certificate is a self-certified limited certificate.

10. The method of claim 8, further comprising the step of digitally signing the temporary certificate.

11. The method of claim 1, further comprising the step of forwarding to the client a certificate maintenance downloadable for causing the client site to monitor the validity period of the temporary certificate.

12. The method of claim 11, wherein the certificate maintenance downloadable further enables the client site to update the temporary certificate before expiration.

13. The method of claim 1, further comprising the step of downloading a certificate de-installation downloadable for causing the client site to de-install the temporary certificate from the client site.

14. The method of claim 13, wherein the de-installation downloadable stores information identifying an unexpired temporary certificate in a revocation list.

15. A system for installing a temporary certificate in a client site, comprising:
   a server for receiving a public key from a client site;
   a temporary certificate generator coupled to the server for generating a temporary certificate containing the public key and a validity period; and
   a certificate installation downloadable coupled to the server for causing the client site to install the temporary certificate, thereby enabling installing of the certificate in the client site without requiring network transfer of a client private key.

16. The system of claim 15, wherein the client site is unconfigured.

17. The system of claim 15, wherein the certificate installation downloadable enables the client site to install the temporary certificate in a web engine.

18. The system of claim 17, wherein the certificate installation downloadable includes an application program interface for communicating with the web engine.

19. The system of claim 15, further comprising a security module coupled to the server for identifying and authenticating the user at the client site.

20. The system of claim 15, wherein the server generates a secure communications channel with the client site.

21. The system of claim 15, further comprising a key generation downloadable for causing the client site to generate the public key and a private key.

22. The system of claim 21, wherein the temporary certificate generator receives a validity period duration request from the client site and uses the duration request to determine the validity period.

23. The system of claim 22, wherein the temporary certificate generator digitally signs the temporary certificate.

24. The system of claim 23, wherein the server includes a server private key, and the temporary certificate generator uses the server private key to digitally sign the temporary certificate.

25. The system of claim 15, further comprising a certificate maintenance downloadable coupled to the server for causing the client site to monitor the validity window of the temporary certificate.

26. The system of claim 25, wherein the certificate maintenance downloadable coupled to the server further enables the client site to update the temporary certificate before expiration.

27. The system of claim 15, further comprising a certificate de-installation downloadable coupled to the server for causing the client site to de-install the temporary certificate from the client site.

28. The system of claim 27, wherein the de-installation downloadable stores information identifying an unexpired temporary certificate in a revocation list.

29. A computer-readable storage medium storing program code for causing a computer to perform the steps of:
   receiving a public key from a client site;
   generating a temporary certificate containing the public key and a validity period; and
   delivering the temporary certificate and a certificate installation downloadable to the client site, thereby enabling installation of the certificate at the client site without requiring network transfer of a client site private key.

30. A method for installing a temporary certificate in a web engine, comprising the steps of:
   generating a public key and a private key;
   sending the public key to a certificate authority;
   providing identification and authentication information to the certificate authority;
   if identified and authenticated, receiving a certificate installation downloadable and a temporary certificate having a short validity period from the certificate authority; and
   using the certificate installation downloadable to install the temporary certificate and the private key in the web engine, thereby enabling installing of the certificate at a client site corresponding to the web engine without requiring network transfer of the private key.

31. The method of claim 30, wherein the web engine is currently unconfigured.

32. The method of claim 30, further comprising the step of sending a temporary certificate duration request to the certificate authority.

33. The method of claim 32, wherein the validity period is based on the temporary certificate duration request.

34. A system for installing a temporary certificate on an unconfigured web engine, comprising:
   a key generation module for generating a public and private key pair;
   a certificate request module for transmitting the pubic key to a certificate authority;
   a certificate installation module for installing a temporary certificate having a short validity period and the private key in an unconfigured web engine, thereby creating a temporarily configured web engine; and
   a certificate maintenance module for monitoring the short validity period to determine if the temporary certificate has expired, thereby enabling installing of the certificate at a client site corresponding to the web engine without requiring network transfer of the private key.

35. The system of claim 34, wherein one of the modules is part of the web engine.

36. The system of claim 34, wherein one of the modules was downloaded from a remote computer.

37. The system of claim 34, wherein one of the modules is a stand-alone application program.

38. The system of claim 34, further comprising a certificate de-installation module for de-installing the temporary certificate upon expiration.

39. The system of claim 34, wherein the certificate maintenance module enables re-issuing the temporary certificate with a new short validity period.

40. The system of claim 34, wherein the certificate request module sends a request which includes the public key and identification and authentication information to the certificate authority.

41. A method of generating a self-certified temporary certificate, comprising the steps of:

receiving a temporary public key and user-identification information from a remote client;

retrieving a long-term public key certificate and a long-term private key from memory;

packaging the temporary public key, the user-identification information, a validity period and the long-term public certificate into a package; and using the long-term private key to sign the package, thereby generating a self-certified temporary certificate without requiring network transfer of the long-term private key.

42. A method of examining a self-certified temporary certificate, comprising the steps of:

receiving a self-certified temporary certificate, which includes a signature, a validity period, a temporary public key, and a long-term public certificate containing a long-term public key and signed by a certificate authority private key associated with a certificate authority;

using a well-known public key associated with the certificate authority private key to verify the certificate authority signing the long-term certificate;

using the long-term public key to verify the signature of the temporary certificate, and thus to verify the client; and enabling access to services during the validity period if the certificate authority and the temporary certificate have been verified, thereby enabling examining of the certificate of the client without requiring network transfer of a client private key.

43. A method of installing a temporary certificate, comprising the steps of:

generating a public and private key pair;

receiving a user-selected certificate duration request;

packaging the public key and the user-selected certificate duration request into a certificate generation request;

sending the certificate generation request to a certificate authority;

receiving a temporary certificate containing the public key and a limited validity period based on the user-selected temporary certificate duration request;

installing the temporary certificate and the private key in a web engine, thereby enabling installing of the certificate at the client without requiring network transfer of the client private key.

44. A method of generating a temporary certificate, comprising the steps of:

receiving a certificate generation request containing a public key and a user-selected certificate duration request from a remote client;

packaging the public key and a certificate validity period based on the user-selected certificate duration request into a package;

signing the package, thereby generating a temporary certificate; and transmitting the temporary certificate to the remote client, thereby enabling generating of the certificate of the remote client without requiring network transfer of a remote client private key.

* * * * *